United States Patent [19]

Omori

[11] Patent Number: 4,561,519
[45] Date of Patent: Dec. 31, 1985

[54] REAR SUSPENSION FOR A MOTORCYCLE

[75] Inventor: Yoshitaka Omori, Saitama, Japan

[73] Assignee: Honda Giken Kogyo Kabushiki Kaisha, Tokyo, Japan

[21] Appl. No.: 491,880

[22] Filed: May 5, 1983

[30] Foreign Application Priority Data

May 11, 1982 [JP] Japan .................................. 57-78692

[51] Int. Cl.$^4$ ............................................ B62K 25/20
[52] U.S. Cl. ...................................... 180/227; 280/284
[58] Field of Search ......................... 180/227; 280/284

[56] References Cited

U.S. PATENT DOCUMENTS 463,710 11/1891 Mathews ......................... 280/284 X
4,412,596 11/1983 Pudil et al. ........................... 180/227

FOREIGN PATENT DOCUMENTS 847109 8/1952 Fed. Rep. of Germany .
7510462 4/1975 France .

Primary Examiner—Joseph F. Peters, Jr.
Assistant Examiner—Charles R. Watts
Attorney, Agent, or Firm—Lyon & Lyon

[57] ABSTRACT

A suspension system for the rear wheel of a motorcycle employing a transversely mounted cushion member located below the rear wheel support frame of the suspension. Pantograph type linkage is employed to translate vertical relative motion of the rear wheel support frame into horizontal transverse motion actuating the cushion member. The linkage is pinned to both the motorcycle frame and to the rear wheel support frame as well as to the transversely mounted cushion mechanism to achieve the foregoing result. The cushion mechanism itself includes a hydraulic damper and a coil spring concentrically arranged.

8 Claims, 4 Drawing Figures they serve to compress and extend the cushion mechanism 62.

REAR SUSPENSION FOR A MOTORCYCLE

BACKGROUND OF THE INVENTION

The field of the present invention is motorcycle suspension systems with particular emphasis on cushion arrangement and linkage therefor.

The design of motorcycles today requires spacesaving, compact systems and components in order that the more and more demanding standards and requirements for features, convenience, safety and optimum design can be accommodated. One area toward which efforts have been directed to reduce the overall volume of the components has been in the rear suspension and in the cushion mechanisms associated with the rear suspension. Recent efforts have been undertaken to move the upright cushion members downwardly such that they extend at least partially through the rear wheel support frame adjacent the pivot axis therefor. This has provided some room for other equipment such as batteries, air cleaners, tool boxes and the like. However, the cushion member has still required extension above the rear wheel support frame in order to provide appropriate clearance above the ground and appropriate suspension cushioning. Additionally, added frame structure is necessary to accommodate the loads transmitted through the cushion member from the rear wheel suspension. As a result, such designs have continued to employ a substantial amount of the area behind the engine for the rear wheel suspension mechanisms.

SUMMARY OF THE INVENTION

The present invention is directed to an improved rear suspension system and the spring and damping mechanisms and linkage therefor. Advantageous placement of the cushion mechanism is contemplated for the present invention beneath the rear wheel support frame and extending transversely of the motorcycle. Such an arrangement eliminates the devotion of the space behind the engine and above the rear wheel support frame to the cushion mechanism. Consequently, other components may be positioned therein such as batteries, air cleaners, tool boxes or the like.

In the placement of the cushion member transversely of the motorcycle, linkage has been developed in a further aspect of the present invention for compression and extension of the cushion mechanism with up and down movement of the rear suspension. To this end, two pivotally mounted links extend to either end of the cushion mechanism so as to convert up and down motion into transverse compression and extension. The linkage mechanism is, therefore, associated with both the frame of the motorcycle and the rear wheel support frame so as to be responsive to the relative motion between those components of the motorcycle.

Accordingly, it is an object of the present invention to provide an improved motorcycle rear wheel suspension system. Other and further objects and advantages will appear hereinafter.

DETAILED DESCRIPTION OF THE PREFERRED EMBODIMENT

Figure 1:
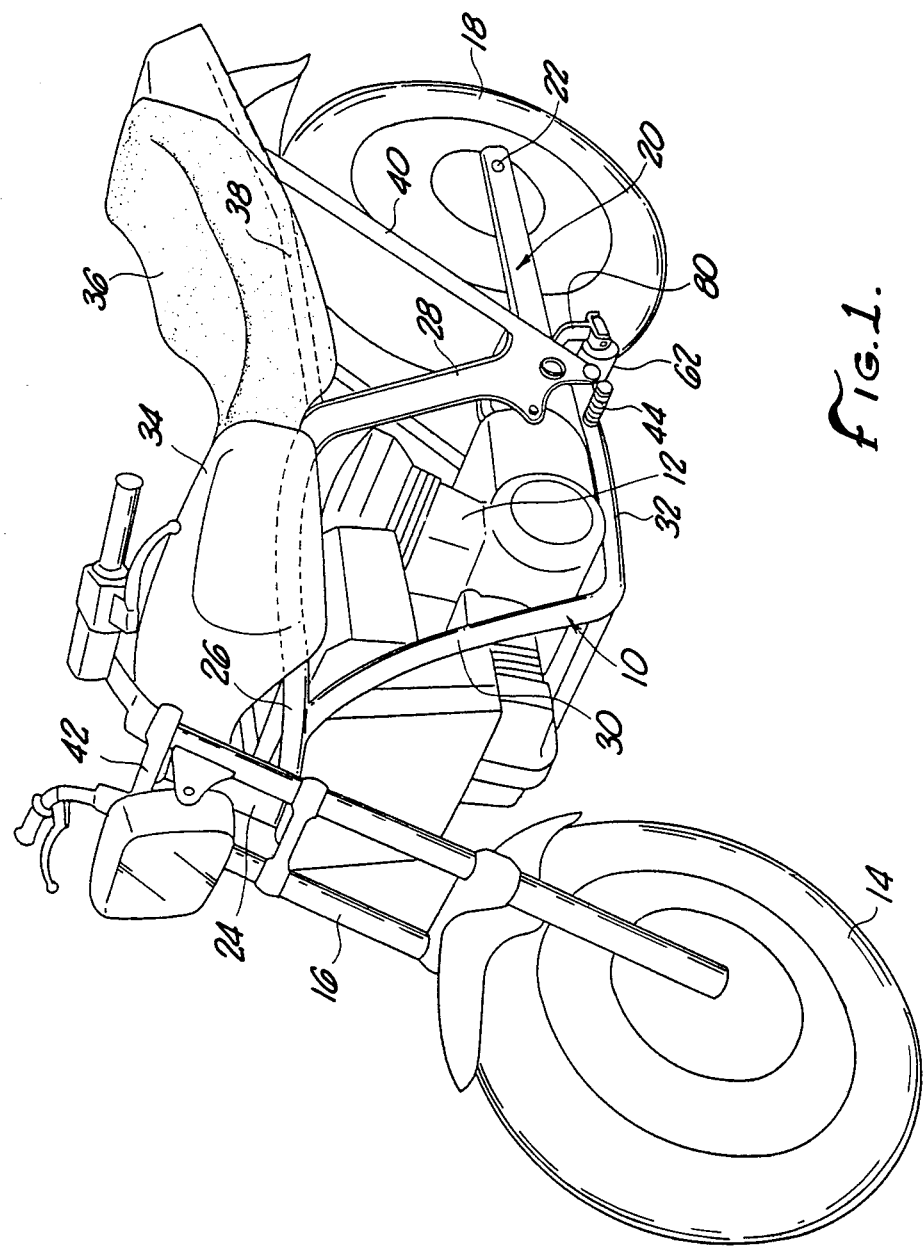
FIG. 1 is a perspective view of a motorcycle employing the mechanism of the present invention.

Turning in detail to the drawings, a motorcycle is illustrated as including a frame, generally designated 10, an engine 12, a front wheel 14 having a supporting front fork 16 and a rear wheel 18 having a rear suspension, generally designated 20 supporting the rear wheel 18 about an axis at 22. The frame includes a head pipe 24 for receipt of the front fork 16. Extending rearwardly from the head pipe 24 on either side are upper main frame members 26. The upper frame members 26 extend rearwardly and then downwardly as center frame members 28 on either side of the motorcycle. Down tubes 30 extend downwardly from the upper frame members 26 to an under carriage 32 extending rearwardly to meet with the center frame members 28. The upper main frame members 26, the center frame members 28, the down tubes 30 and the under carriage 32 generally surround the engine, transmission, cooling system and other associated components. Positioned on the upper main frame members 26 is a gas tank 34. A seat 36 is positioned on a rearwardly extending portion of the frame including a pair of side rails 38 extending rearwardly from the main portion of the frame and back stays 40 extending upwardly from adjacent the intersection of the center frame members 28 and the under carriage 32. Additionally, a handlebar assembly 42 is associated with the front fork 16 and foot pegs 44 are fixed to the under carriage 32.

Figure 2:
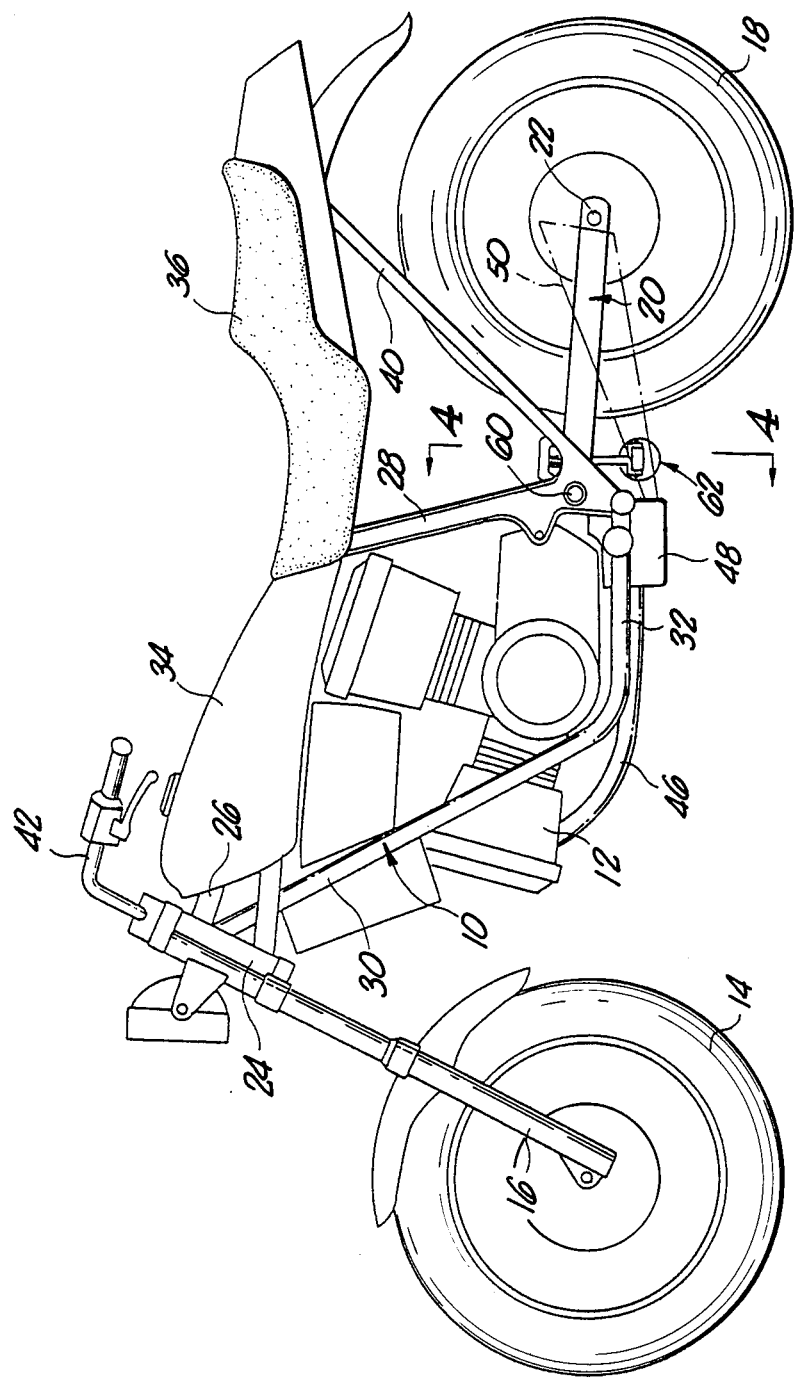
FIG. 2 is a side view of the motorcycle of FIG. 1.
Figure 3:
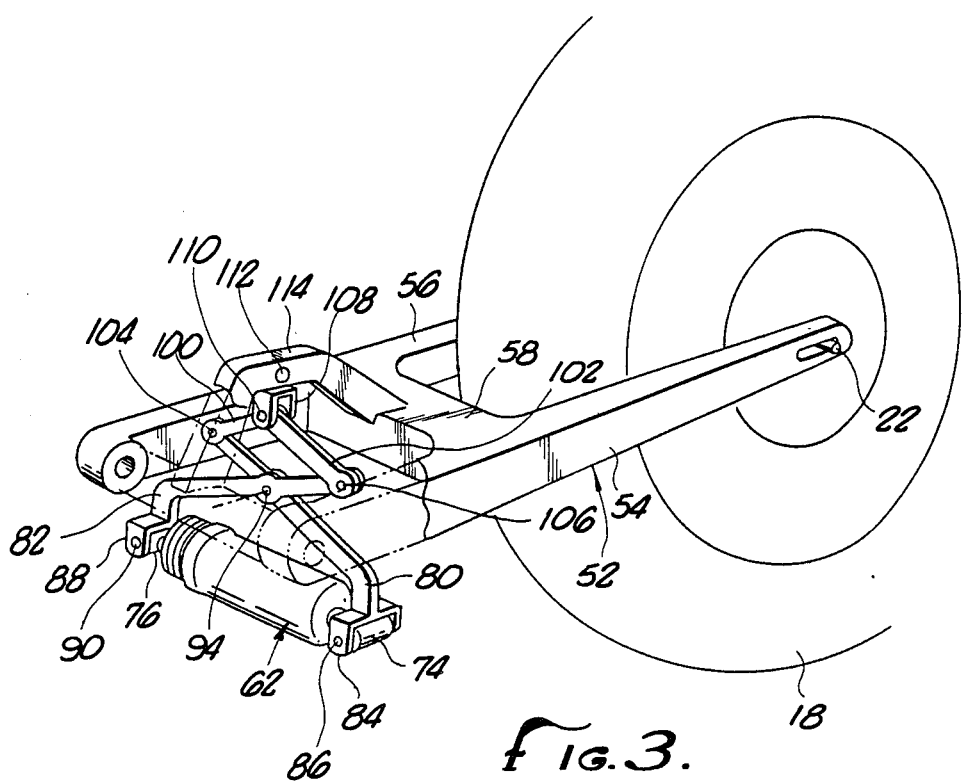
FIG. 3 is a perspective view of the rear suspension system.

Looking specifically to FIG. 2, the location of an exhaust system is also illustrated. A front exhaust pipe 46 extends rearwardly beneath the under carriage 32 from the front cylinder or bank of cylinders of the engine 12. A collector 48 is positioned inwardly of the side frame members in a location below the transmission. The tail pipes 50 are illustrated in phantom as extending rearwardly from the collector 48.

The rear suspension 20 of the motorcycle includes a rear wheel support frame 52 including two side bars 54 and 56 having a cross member 58 extending to join the side bars 54 and 56 in front of the rear wheel 18. The side bars 54 and 56 extend rearwardly to support the rear wheel 18 about the axis 22. Forwardly of the cross member 58, the side bars 54 and 56 extend to a horizontal bearing member 60 for pivotally mounting the support frame 52. The horizontal bearing member 60 is located near the lower end of each of the center frame members 28 in an appropriate location for the mounting of the rear suspension. As the cross member 58 is displaced rearwardly from the location of the horizontal bearing member 60 and the side bars 54 and 56 are spaced apart from one another, a vertical passage is defined among these elements. It is within this passage that the cushion mechanism and the linkage therefor are arranged.

The cushion mechanism, generally designated 62, includes a coil spring 64 and a hydraulic damper 66 centered within the coil spring 64. Spring bearing caps 68 and 70 are positioned on the ends of the coil spring 64 and hydraulic damper 66; and a housing 72 surrounds the components between the caps. Outwardly of the spring bearing caps 68 and 70 are mounts 74 and 76. The mounts 74 and 76 are fixed to the damper 66 and the damper rod 78, respectively. Further, the mounts 74 and 76 acting through the spring bearing caps 68 and 70 compress the springs as they are moved toward one another.

As can be seen in each of the figures, the cushion mechanism 62 is arranged transversely of the motorcycle. That is to say, the cushion mechanism 62 is arranged generally parallel to the axis 22 of the rear wheel 18 and to the axis of the horizontal bearing member 60. Its location is sufficiently raised to provide adequate clearance above the ground and yet is totally removed from the area above the rear wheel support frame 52.

To mount the cushion mechanism 62 for cooperation with the rear suspension, linkage means is provided which is fixed to either cushion member mount 74 and 76, the motorcycle frame 10 and the rear wheel support frame 52. Pivotally affixed to the mounts 74 and 76 is a pantograph type mechanism including a first link 80 and a second link 82. The first link 80 is fixed to the mount 74 at one end 84 by means of a pin 86. Similarly, the second link 82 is fixed to the mount 76 at one end 88 by means of a pin 90.

Extending between the center frame members 28 is a frame cross member 92. The first link 80 and second link 82 cross adjacent the frame cross member 92 and are pinned to it so as to pivot about an axis 94 located roughly parallel to the center line of the bike. By pivoting about the axis 94, the first and second links 80 and 82 are able to compress and extend the cushion mechanism 62. The full extent of this compression and extension is contained within a profile that does not exceed the frame width of the motorcycle as graphically illustrated in FIG. 4 where the frame members of the under carriage 32, the foot peg mounting brackets 96 and the foot pegs 44 are illustrated in phantom outwardly of the cushion and linkage assembly.

At the upper ends 97 and 98 of the links 80 and 82, respectively, a mounting means is provided for fixing the links 80 and 82 to move with the rear wheel support frame 52. Because of the nature of the links 80 and 82 and their mounting about the axis 94, relative movement laterally to the movement of the rear wheel support frame 52 must be accommodated. As a result, the mounting means must allow a certain degree of freedom in the lateral direction for the ends 97 and 98. The mounting means found advantageous in the preferred embodiment include two additional links 100 and 102 pivotally mounted to the first and second links 80 and 82, respectively. The pivotal coupling is about pins 104 and 106. By using a pantograph type mechanism, the lateral movement of the ends of the links 80 and 82 are easily accommodated. However, other mechanisms such as rollers on cam surfaces and the like may be employed to the same result.

To affix the links 100 and 102 of the mounting means to move with the rear wheel support frame 52, a mounting bracket 108 is provided. The mounting bracket 108 is pinned for pivotal relative movement to the upper links 100 and 102 by a pin 110. This pin extends roughly parallel to the axis 94 about which the first and second links 80 and 82 are pivotally mounted. The bracket 108 is in turn pivotally mounted to the rear wheel support frame 52 about a transverse axis by a pin 112.

To provide a convenient mounting position for the mounting bracket 108, the rear wheel support frame 52 includes a mounting bridge 114 extending between the cross member 58 and a sleeve 116 positioned about the horizontal bearing member 60. The sleeve 116 extends on the horizontal bearing member 60 between the side bars 54 and 56 as can best be seen in FIG. 4. Thus, the mounting bridge 114 spans the opening created in the rear wheel support frame 52 such that the cushion linkage and cushion mechanism may be disposed within that opening.

Looking specifically to the operation of the system, the linkage mechanism is responsive to the relative movement between the motorcycle frame and the rear wheel support frame by being connected to both of these components. As the rear wheel support frame 52 moves upwardly, the mounting links 100 and 102 are drawn upwardly to cause pivotal rotation of the lower links 80 and 82 about the pivot axis 94. This action in turn compresses the cushion mechanism by inward movement of the ends 84 and 88 of the links 80 and 82. Downward motion of the rear wheel support frame 52 would result in the opposite effect.

Figure 4:
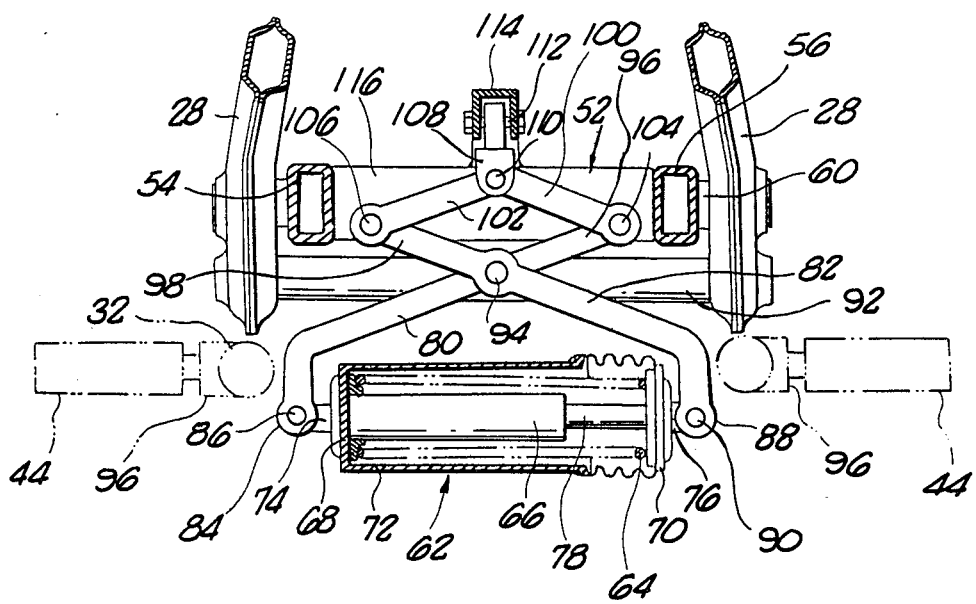
FIG. 4 is a cross-sectional elevation taken along line 4—4 of FIG. 2.

The advantageous location of the cushion mechanism and its accompanying linkage is possibly best illustrated in FIG. 2 where it is shown to extend no lower than the exhaust system, is advantageously positioned between the horizontal bearing member 60 and the rear wheel 18 and barely extends upwardly above the top plane of the rear wheel support frame 52. FIG. 2 illustrates the substantial amount of room which is provided, primarily adjacent and rearwardly of the center frame members 28 which had been previously occupied by the cushion mechanism. Again, FIG. 4 illustrates the lateral extent of the mechanism which clearly does not affect the overall width of the motorcycle.

Thus, an advantageous suspension system has been disclosed which provides substantial advantage in its compactness and location. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A rear suspension for a motorcycle having a frame, comprising
   a rear wheel support frame pivotally mounted to the frame of the motorcycle such that the frame and said rear wheel support frame exhibit relative pivotal motion with operation of the suspension;
   a rear cushion member positioned beneath said rear wheel support frame and extending transversely of the motorcycle; and
   linkage means for inducing compression and extension of said cushion member with up and down pivotal motion of said rear wheel support frame relative to the frame of the motorcycle.

2. The rear suspension of claim 1 wherein said cushion member includes both a spring and a damper.

3. The rear suspension of claim 1 wherein said linkage means includes a first link extending to one end of said cushion member, said first link being pivotally mounted at a first point on said first link to the frame of the motorcycle and connected at a second point on said first link to said rear wheel support frame to move with the pivotal motion thereof relative to the frame of the motorcycle and a second link extending to the other end of said cushion member, said second link being pivotally mounted at a first point on said second link to the frame of the motorcycle and at a second point on said second link connected to move with the pivotal motion of said rear wheel support frame relative to the frame of the motorcycle said first point on said first link being common with said first point on said second link.

4. The rear suspension of claim 3 wherein said linkage means further includes a third link pivotally mounted at said second point to said first link and a fourth link pivotally mounted to said second link at said second point, said third and fourth links further being pivotally mounted to said rear wheel support frame.

5. The rear suspension of claim 4, wherein said linkage means forms a pantograph.

6. A rear suspension for a motorcycle having a frame, comprising
   a rear wheel support frame pivotally mounted to the frame of the motorcycle such that the frame and said rear wheel support frame exhibit relative pivotal motion with operation of the suspension;
   a rear cushion member positioned beneath said rear wheel support frame and extending transversely of the motorcycle; and
   cushion linkage including a first link extending to one end of said cushion member, a second link extending to the other end of said cushion member, said first and second links being pivotally mounted intermediate their ends to the motorcycle frame, and mounting means connecting one end of each of said first and second links to move with said rear wheel support frame and allowing pivotal movement of said first and second links.

7. The rear suspension of claim 6 wherein said mounting means includes a third link pivotally mounted to said one end of said first link, a fourth link pivotally mounted to said one end of said second link, and a mounting bracket pivotally mounted to said third and fourth links, said mounting bracket being pivotally mounted to said rear wheel support frame.

8. The rear suspension of claim 7, wherein said first second links are pivotally mounted intermediate their ends to the motorcycle frame about coincident axes.

* * * * *